United States Patent [19]
Baldus et al.

[11] Patent Number: 5,605,871
[45] Date of Patent: Feb. 25, 1997

[54] PROCESS OF PRODUCIING SINTERED MATERIALS BASED ON SI$_3$N$_4$/BN USING SI-B-N COMPONENT

[75] Inventors: Hans-Peter Baldus, Leverkusen; Gerd Passing, Köln; Gerhard Wötting, Coburg, all of Germany

[73] Assignee: Bayer AG, Leverkusen, Germany

[21] Appl. No.: 497,772

[22] Filed: Jul. 3, 1995

[30] Foreign Application Priority Data

Jul. 18, 1994 [DE] Germany ............... 44 25 312.5

[51] Int. Cl.$^6$ ............................................. C04B 35/583
[52] U.S. Cl. ..................... 501/96; 501/97; 501/98; 264/65
[58] Field of Search ................... 501/96, 97, 98; 264/65

[56] References Cited

U.S. PATENT DOCUMENTS

| | | | |
|---|---|---|---|
| 5,030,598 | 7/1991 | Hsieh | 501/97 |
| 5,128,286 | 7/1992 | Funayama et al. | 501/97 |
| 5,324,694 | 6/1994 | Petrak et al. | 501/97 |
| 5,389,587 | 2/1995 | Nakashima et al. | 501/97 |

FOREIGN PATENT DOCUMENTS 4107108  9/1992  Germany .

OTHER PUBLICATIONS

Asano et al., *Reactivity Between BN Composite Ceramics and Molten Stainless Steel*, Taikabutsu Overseas, vol. 11, No. 3, pp. 3–11 (1991).

C. Doche and F. Thévenot, *Elaboration and Characterization of Si$_3$N$_4$–BN Composites*, Key Engineering Materials, vol. 89–91, pp. 449–454 (1994).

Orbit Abstract of DE 41 07 108 (Sep. 10, 1992).

Derwent Abstract of JP–238767 (Sep. 25, 1987).

Kawasaki Steel Technical Report, Nr. 23, pp. 5–11, K. Isomura et al., "Development of Machinable Si$_3$N$_4$–BN Composite Ceramics", Oct., 1990.

Mat. Res. Soc. Symp. Proc., Bd. 271, pp. 821–826, H.-P. Baldus et al., "Synthesis of Advanced Ceramics in the Systems Si–B–N and Si–B–N–C Employing Novel Precursor Compounds", 1992. No Month.

*Primary Examiner*—Karl Group
*Attorney, Agent, or Firm*—Connolly & Hutz

[57] ABSTRACT

The present invention relates to a process for the production of sintered materials comprising BN, sintering additives and at least one compound selected from the group consisting of Si$_3$N$_4$ and SiAlON, wherein the BN component is present in the form of crystalline particles with an average particle size <2 μm and the BN content amounts to between 0.1 and 34 vol-%. In the process, a single phase amorphous Si—B—N component with a specific surface <1.5 m/g and optionally Si$_3$N$_4$-powder is mixed with oxidic and/or nitridic sintering additives to form a mixture, the mixture is formed into a moulded article, and the moulded article is sintered at temperatures in the range from 1,450° C. to 2,100° C. in an atmosphere which contains N$_2$.

12 Claims, No Drawings

PROCESS OF PRODUCING SINTERED MATERIALS BASED ON SI$_3$N$_4$/BN USING SI-B-N COMPONENT

BACKGROUND OF THE INVENTION

The present invention relates to sintered materials based on Si$_3$N$_4$/BN and/or SiAlON/BN and also to processes for their production. In accordance with the state of the art, composite ceramics consisting of Si$_3$N$_4$, BN and oxidic grain-boundary phase are produced from the binary powder components Si$_3$N$_4$, BN and oxidic sintering aids at high temperatures between 1,600° and 2,000° C. by sintering without pressure, pressure sintering, hot pressing or hot isostatic pressing. However, this conventional powder-metallurgy production method has a number of disadvantages:

Owing to the foliated morphology of the BN the addition of hexagonal BN powder to Si$_3$N$_4$ powder with oxidic sintering additives leads to impairment of the pressing characteristics of the Si$_3$N$_4$ powder with the sintering additives. With increasing BN content the pressed articles show increased creep recovery after moulding and reduced densities in the pressed state.

Just small amounts of BN impair the sintering characteristics of the Si$_3$N$_4$ and result in higher porosities in the composite ceramic. In order to be able to produce high-quality compact ceramics, expensive manufacturing processes such as hot pressing or hot isostatic pressing have to be adopted (JA-A 01 083 507, Asano et al, Taikabutsu Overseas, Vol. 11, 1991, No. 3, pages 3 to 11, and Doche et al, Key Engineering Materials, Vol. 89–91, 1994, pages 449 to 454, Switzerland).

Sintering without pressure or pressure sintering results in composites having low density and poor mechanical properties (Isomura et al, Kawasaki Steel Technical Report, No. 23, Oct. 1990, pages 5 to 11).

With regard to the physical properties of the composite ceramic it is of essential importance that the BN is distributed homogeneously within the Si$_3$N$_4$ matrix. Homogeneous initial powder mixtures ale required for high-quality composites. But even with elaborate grinding procedures it is difficult to achieve sufficient homogeneity of the initial powder mixture.

It is furthermore known that, according to DE 4 107 108 A1, it is possible to produce monophase amorphous silicon boron nitride ceramic (Si$_3$B$_3$N$_7$). Baldus et al. (Better Ceramics Through Chemistry V, Vol. 271, 1992, pp 821–826) describe the production of ceramic moulded articles produced from a powder mixture consisting of 90 wt-% Si$_3$B$_3$N$_7$ powder, 5 wt-% Al$_2$O$_3$ powder and 5 wt-% Y$_2$O$_3$ powder by sintering without pressure. Prior to being ground the Si$_3$B$_3$N$_7$ powder has a specific surface of 60 m$^2$/g. But ceramics produced in this way have a porosity of almost 40%, so that their use in applications with high mechanical loads is ruled out.

SUMMARY OF THE INVENTION

An object of the present invention was the provision of sintered materials which do not exhibit the described disadvantages of the state of the art.

These requirements are satisfied by sintered materials based on Si$_3$N$_4$/BN and/or SiAlON/BN and sintering additives, whereby the BN component is present in the form of crystalline particles with an average particle size <2 μm and the BN content amounts to between 0.1 and 34 vol-%. The average particle size is determined by measuring the maximum particle diameter on REM photographs.

DESCRIPTION OF THE PREFERRED EMBODIMENTS

In a preferred embodiment the sintered materials contain non-reactive metal carbides, nitrides and/or silicides in quantities from 0.1 to 35 vol-%. Particularly suitable non-reactive metal carbides, nitrides and/or silicides in the sense of this invention are SiC, B$_4$C, TiC, ZrC, NbC, TaC, TiN, HfN, MoSi$_2$.

The sintered materials according to the invention preferably contain oxidic and/or nitridic sintering additives in quantities from 1 to 20 wt-%. Particularly suitable sintering additives in this regard are MgO, Al$_2$O$_3$, SiO$_2$, TiO$_2$, ZrO$_2$, HfO$_2$, Sc$_2$O$_3$, Y$_2$O$_3$, La$_2$O and also other rare-earth oxides and/or AlN or combinations thereof. Particularly good physical properties are exhibited by the sintered materials according to the invention when..a liquid phase amounting to at least 5 vol-% is formed under the conditions of sintering.

The bending strength of the sintered materials according to the invention exceeds by a factor of 5 the strength of conventionally produced Si$_3$N$_4$/BN composites that are sintered without pressure and is comparable to the bending strength of hot-pressed Si$_3$N$_4$/BN composites. Hence the sintered materials according to the invention can be densified by normal-pressure or gas-pressure sintering to densities >85% of the theoretical density.

The physical properties of the sintered materials according to the invention are established by the improved homogeneity of the structure and the higher density in the sintered state. Depending on the BN content, the bending strength of the sintered materials amounts to between 200 MPa and 1,400 MPa, preferably between 400 and 1,400 MPa. The Vickers hardness of the Si$_3$N$_4$/BN sintered materials amounts to between 2 and 20 GPa, advantageously between 3 and 20 GPa.

Also an object of this invention is a process for the production of the sintered materials according to the invention. For it was found, surprisingly, that by the use of a single phase amorphous Si-B-N component such as Si$_3$B$_3$N$_7$ powder with a specific surface <1.5 m$^2$/g in conjunction with sintering aids it is possible to obtain ceramic articles of high density by sintering. Consequently an object of this invention is a process for the production of sintered materials whereby, starting from a single phase amorphous Si-B-N component with a specific surface <1.5 m$^2$/g and, optionally, Si$_3$N$_4$ powder subject to addition of oxidic and/or nitridic sintering additives, a mixture is produced, optionally milled from said mixture a moulded article is formed, and the latter is sintered at temperatures in the range from 1,450° C. to 2,100° C. in an atmosphere which contains N$_2$.

With the process according to the invention the production of the Si$_3$N$_4$/BN sintered materials can be improved in such a way that it is possible to manage without elaborate production processes such as hot pressing or hot isostatic pressing.

The process according to the invention is advantageously implemented in such a way that use is made of a mixture with an Si/B ratio of 1:1 to 170:1. This Si/B ratio can be shifted towards higher proportions of Si in two ways: on the one hand, by the ratio of Si/B in the monophase amorphous Si-B-N component and, on the other hand, by addition of Si$_3$N$_4$ powder to the Si-B-N component. In the case of addition of Si$_3$N$_4$ powder, use may advantageously be made of powders having a mineralogical phase composition which exhibits the α phase and/or the β phase and/or which includes amorphous Si$_3$N$_4$ constituents.

Particularly good mechanical properties are exhibited by the sintered materials produced in accordance with the invention if they contain by way of principal constituents at least 75 vol-% $Si_3N_4$ and BN, whereby the remaining proportion making up 100% consists of an oxidic and/or nitridic grain-boundary phase. This grain-boundary phase may be composed of several phases that are amorphous and/or crystalline. Corresponding conditions apply also to the sintered materials according to the invention, which furthermore exhibit non-reactive carbidic, nitridic and/or silicidic phases.

In comparison with the state of the art the globular to flattened particle morphology of the monophase amorphous Si—B—N component which is used with the process according to the invention enables the production of powder mixtures which are capable of being sintered and, which are outstandingly suitable for moulding. By the use of the Si—B—N component with a reduced specific surface the sintering activity is increased in such a way that it is possible to produce sintered materials with high BN contents and, at the same time, high density in the sintered state, merely by sintering without pressure or by gas-pressure sintering. Consequently the process according to the invention can be implemented advantageously by sintering at gas pressures up to 5 bar. In this connection the gas consists of nitrogen and may contain additions of noble gases and/or inert gases such as carbon dioxide. The thermal decomposition of the $Si_3N_4$ into Si and $N_2$ is prevented by the gas. The sintering can also be implemented advantageously as gas-pressure sintering at pressures in the range from 5 to 200 bar. By virtue of the freely adjustable BN content of the sintered materials to high BN contents amounting to 34 wt-%, corresponding to an Si/B ratio of 1:1, without incurring any disadvantages with regard to the densities in the sintered state, the physical properties of the sintered materials can be influenced within a wide range.

A further advantage of the process according to the invention arises in the case of powder mixtures of monophase amorphous Si—B—N components and $Si_3N_4$ with regard to the homogeneity of the mixture. In the preferred $Si_3B_3N_7$ the B, N and Si are distributed homogeneously on the molecular level, which corresponds to a premixing of the components. In addition, 1 mol BN in the form of the compound $Si_3B_3N_7$ has a volume of 38 $cm^3$, whereas in the form of hexagonal BN it has a volume of only 11 $cm^3$. It is obvious that a given molar quantity of BN of defined particle size in the form of a large volume of $Si_3B_3N_7$ can be distributed more homogeneously within an $Si_3N_4$ powder by mechanical mixing than can the same molar quantity of hexagonal BN with only 29% of the volume. Also advantageous is the fact that large volumes can be dosed more easily than small volumes.

Although the process according to the invention has particular advantages as regards economy in the case of sintering at gas pressures in the range from 0 to 200 bar, it is not restricted to such sintering processes. The sintering can also be implemented advantageously in the form of hot pressing or an HIP sintering process or an HIP capsule process.

The invention is elucidated below by way of examples, wherein no restriction is to be inferred.

EXAMPLE 1

9 g $Si_3B_3N_7$ powder with a specific surface of 0.52 $m^2/g$ and a particle size less than 0.3 mm were ground in isopropanol for 6 hours in a planetary ball mill and at the same time mixed with 0.5 g $Y_2O_3$ powder and 0.5 g $Al_2O_3$ powder. In this process the $Si_3B_3N_7$ powder was ground to a specific surface of about 10 $m^2/g$. The powder was moulded in cold isostatic manner into cylinders having a diameter of 10 mm and a height of 15 mm. The green article was heated in nitrogen at a rate of 24° C./min to 1,900° C. and maintained at this temperature for 1 hour. The resulting monolithic, crack-free article had a final density of 2,540 kg/$m^3$, corresponding to 89% of the theoretical density. X-ray diffraction measurements indicate that a phase separation of the monophase $Si_3B_3N_7$ into $Si_3N_4$ and BN has taken place. When ground, the microstructure exhibits three phases with respective proportions of 57% $Si_3N_4$, 27.5% BN and 15.5% oxidic grain-boundary phase. The BN is present as an accumulation of small crystallites which form islands with an average diameter of 1 μm-determined by measuring the maximum particle diameter on REM photographs. These BN concentrations are distributed homogeneously within the $Si_3N_4$ matrix. The Vickers hardness of the composite material amounts to $HV_2$=3.9 GPa and the bending strength amounts to 410 MPa.

EXAMPLE 2

(Comparison)

9 g $Si_3B_3N_7$ powder with a specific surface of 2.4 $m^2/g$ and a particle size less than 0.3 mm were ground in isopropanol for 6 hours in a planetary ball mill and at the same time mixed with 0.5 g $Y_2O_3$ powder and 0.5 g $Al_2O_3$ powder. The powder was moulded in cold isostatic manner into cylinders having a diameter of 10 mm and a height of 15 mm. The green article was heated in nitrogen at a rate of 24° C./min to 1,900° C. and maintained at this temperature for 1 hour. The resulting monolithic, crack-free article had a final density of 2,010 kg/$m^3$, corresponding to 70% of the theoretical density.

EXAMPLE 3

(Comparison)

5.86 g $Si_3N_4$ powder with a specific surface of 19 $m^2/g$ and 3.14 g BN powder with a specific surface of 13 $m^2/g$ were ground in isopropanol for 6 hours in a planetary ball mill and at the same time mixed with 0.5 g $Y_2O_3$ powder and 0.5 g $Al_2O_3$ powder. The powder was moulded in cold isostatic manner into cylinders having a diameter of 10 mm and a height of 15 mm. The green article was heated in nitrogen at a rate of 24° C./min to 1,900° C. and maintained at this temperature for 1 hour. The resulting monolithic, crack-free article had a final density of 1,850 kg/$m^3$, corresponding to 65% of the theoretical density, and had a chalky consistency.

EXAMPLE 4

3 g $Si_3B_3N_7$ powder with a specific surface of 0.52 $m^2/g$ and a particle size less than 0.3 mm were ground in isopropanol for 6 hours in a planetary ball mill and at the same time mixed with 6 g $Si_3N_4$, 0.5 $Y_2O_3$ powder and 0.5 g $Al_2O_3$ powder. The powder was moulded in cold isostatic manner into cylinders having a diameter of 10 mm and a height of 15 mm. The green article was heated in nitrogen at a rate of 24° C./min to 1,900° C. and maintained at this temperature for 1 hour. The resulting monolithic, crack-free article had a final density of 3,070 kg/$m^3$, corresponding to 97% of the theoretical density. When ground, the polished microstructure exhibits three phases with respective proportions of 83% $Si_3N_4$, 11% BN and 6% oxidic grain-boundary phase. The BN is present as an accumulation of small crystallites which form islands with an average diameter of 0.8 μm. These BN concentrations are distributed homogeneously within the $Si_3N_4$ matrix. The Vickers hardness of the material amounts to $HV_2$=11.5 GPa.

EXAMPLE 5

3 g $Si_3B_3N_7$ powder with a specific surface of 0.52 m$^2$/g and a particle size less than 0.3 mm were ground in isopropanol for 6 hours in a planetary ball mill and at the same time mixed with 6 g $Si_3N_4$, 0.5 $Y_2O_3$ powder and 0.5 g $Al_2O_3$ powder. The powder was moulded in cold isostatic manner into cylinders having a diameter of 10 mm and a height of 15 mm. The green article was heated in nitrogen at a rate of 24° C./min to 1,900° C. and gas-pressure sintered at this temperature for 1 hour with 80 bar nitrogen. The resulting monolithic, crack-free article had a final density of 3,100 kg/m$^3$, corresponding to 98% of the theoretical density. When ground, the microstructure exhibits three phases with respective proportions of 83% $Si_3N_4$, 11% BN and 6% oxidic grain-boundary phase. The BN is present as an accumulation of small crystallites which form islands with an average diameter of 0.8 μm. These BN concentrations are distributed homogeneously within the $Si_3N_4$ matrix. The Vickers hardness of the material amounts to HV$_2$=12.9 GPa and the bending strength amounts to 800 MPa.

EXAMPLE 6

Blank articles were pressed uni-axially at 82 MPa from the powders of the comparative Examples 2 and 3. The density of the pressed article from Example 2 amounted to 1,140 kg/m$^3$, corresponding to 57% of the theoretical density. After removal from the mould the creep recovery of the pressed article amounted to 1.5%. On the other hand, the pressed article from Example 3 hid a density of 1,440 kg/m$^3$, corresponding to 47% of the theoretical density. The creep recovery of the sample amounted to only 0.4%.

In the following Table 1 the physical properties of the materials according to the invention are juxtaposed with those corresponding to the state of the art.

TABLE 1

| Sample | Example No. 1 | Example No. 5 | Isomura[1] | Douche[2] | Asano[3] | |
|---|---|---|---|---|---|---|
| BN-Content (wt.-%) | 32 | 11 | 32 | 16 | 10 | 30 |
| Density ρ/ (kg/m$^3$) | 2540 | 3100 | — | — | 3070 | — |
| Density ρ/ (% th. dens.) | 89 | 98 | 62 | 85 | 96 | 88 |
| 3-point Bending Strenght (σ/(MPa) | 410 | 800 | 70 | 320 | 700 | 345 |
| Vickers Hardness HV$_2$ (GPa) | 3,9 | 12,9 | — | — | 10 | — |

[1] Isomura et al., Kawasaki Steel Technical Report, No. 23, Oct. 1990, pages 5–11.
[2] Douche et al., Key Engineering Materials, Vol. 89–91, 1994, pages 449–454, Switzerland.
[3] Asano et al., Taikabutsu Oberseas, Vol. 11, 1991, No. 3, pages 3–11.

We claim:

1. Process for the production of sintered materials comprising BN, sintering additives and at least one compound selected from the group consisting of $Si_3N_4$ and SiAlON, wherein the BN is present in the form of crystalline particles with an average particle size ≦2 μm and the BN content amounts to between 0.1 and 34 vol-%, further wherein in said process a single phase amorphous Si-B-N component with a specific surface <1.5 m$^2$/g is mixed with sintering additives and optionally $Si_3N_4$ powder to form a mixture, the mixture is formed into a moulded article, and the moulded article is sintered at temperatures in the range from 1,450° C. to 2,100° C. in an atmosphere which contains N$_2$.

2. Process according to claim 1, wherein the Si/B molar ratio of the mixture is from 1:1 to 170:1.

3. Process according to claim 1, wherein the sintering is performed at gas pressures up to 5 bar.

4. Process according to claim 1, wherein the sintering is implemented as gas-pressure sintering at pressures in the range from 5 to 200 bar.

5. Process according to claim 1, wherein the sintering is implemented as hot pressing.

6. Process according to claim 1, wherein the sintering is implemented as an HIP sintering process.

7. Process according to claim 1, wherein the sintering is implemented as an HIP capsule process.

8. Process according to claim 1, wherein the mixture comprises $Si_3N_4$ powder.

9. Process according to claim 1, wherein the sintering additives are selected from the group consisting of MgO, $Al_2O_3$, $SiO_2$, $TiO_2$, $ZrO_2$, $HfO_2$, $Sc_2O_3$, $Y_2O_3$, and $La_2O$.

10. Process according to claim 1, wherein the sintering additive is AlN.

11. Process for the production of sintered materials comprising BN, sintering additives and at least one compound selected from the group consisting of $Si_3N_4$ and SiAlON, wherein the BN is present in the form of crystalline particles with an average particle size ≦2 μm and the BN content amounts to between 0.1 and 34 vol-%, further wherein in said process a single phase amorphous Si-B-N component with a specific surface ≦1.5 m$^2$/g is mixed with sintering additives, optionally $Si_3N_4$ powder, and at least one filler material to form a mixture, the mixture is formed into a moulded article, and the moulded article is sintered at temperatures in the range from 1,450° C. to 2,100° C. in an atmosphere which contains N$_2$.

12. Process according to claim 11, wherein the at least one filler material is selected from the group consisting of metal carbides, metal nitrides and metal silicides.

* * * * *

UNITED STATES PATENT AND TRADEMARK OFFICE
CERTIFICATE OF CORRECTION

PATENT NO. : 5,605,871
DATED : February 25, 1997
INVENTOR(S) : Baldus, et al

It is certified that error appears in the above-indentified patent and that said Letters Patent is hereby corrected as shown below:

In the Abstract, item [57], line 6, "$<2\mu m$" should be --$\leq 2\mu m$--
line 8, "$<1.5$ m/g" should be --$\leq 1.5$ m/g--.

In Column 6, line 10 (Claim 1), "$<1.5$ m$^2$/g" should be --$\leq 1.5$ m$^2$/g--.

Signed and Sealed this

Sixteenth Day of September, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,605,871
DATED : February 25, 1997
INVENTOR(S) : Baldus, et al

It is certified that error appears in the above-indentified patent and that said Letters Patent is hereby corrected as shown below:

Column 1, line 64, "<2 µm" should be -- ≤2 µm--; in Column 2, line 15, "when..a" should be --when a--; in Column 2, line 25, ">85%" should be --≥85%-- and in Column 2, lines 38 and 43, "<1.5 m²/g" should be --≤1.5 m²/g--.

Signed and Sealed this

Fourteenth Day of October, 1997

BRUCE LEHMAN

*Attest:*

*Attesting Officer*     Commissioner of Patents and Trademarks